United States Patent [19]

Buma

[11] Patent Number: 4,635,906
[45] Date of Patent: Jan. 13, 1987

[54] SUSPENSION FOR VEHICLE
[75] Inventor: Shuuichi Buma, Toyota, Japan
[73] Assignee: Toyota Jidosha Kabushiki Kaisha, Toyota, Japan
[21] Appl. No.: 783,189
[22] Filed: Oct. 2, 1985
[30] Foreign Application Priority Data
Nov. 19, 1984 [JP] Japan .................. 59-242266
[51] Int. Cl.⁴ ............... B60G 13/00; B60G 15/00; F16F 9/00; F16F 11/00
[52] U.S. Cl. ................. 267/8 R; 188/299; 267/35; 267/64.15; 267/64.24; 267/152; 280/707; 280/714
[58] Field of Search ............. 267/35, 8, 64.15–64.28, 267/152, 140.1, 140.3; 188/299, 285–287, 318, 319, 298; 280/707, 708, 712, 714

[56] References Cited
U.S. PATENT DOCUMENTS

| 4,313,529 | 2/1982 | Kato et al. | 188/299 |
| 4,534,580 | 8/1985 | Kobayashi et al. | 267/64.25 X |
| 4,592,540 | 6/1986 | Yokoya et al. | 267/35 X |

FOREIGN PATENT DOCUMENTS
199112 6/1981 Japan .

Primary Examiner—Douglas C. Butler
Attorney, Agent, or Firm—Oblon, Fisher, Spivak, McClelland & Maier

[57] ABSTRACT

A suspension for a vehicle comprises a shock absorber for damping vibration given from a wheel including a cylinder, a piston dividing the inside of the cylinder into two liquid chambers and a piston rod connected to the piston and having a bypass path for affording communication between two liquid chambers, a bushing interposed between the piston rod and a car body and having two fluid chambers spaced from each other axially of the piston rod and an air spring having two air chambers for damping the vibration given from the wheel in cooperation with the shock absorber. The damping force of the shock absorber, the spring constant and damping force of the bushing and the spring constant of the air spring can be adjusted by an actuator from the outside in three or two steps.

15 Claims, 14 Drawing Figures

SUSPENSION FOR VEHICLE

BACKGROUND OF THE INVENTION

1. Field of the Invention

This invention relates to a suspension for a vehicle, and more particularly to a suspension provided with an air spring formed of a housing and a diaphragm in association with a shock absorber.

2. Description of the Prior Art

There is a suspension which comprises a shock absorber and an air spring surrounding the shock absorber with a housing and a diaphragm to form an air chamber filled with compressed air so that the damping force of the shock absorber and the spring constant of the air spring can be adjusted from the outside at the same time (employed as an electronic control suspension for some passenger cars).

SUMMARY OF THE INVENTION

According to said suspension, since the damping force of the shock absorber and the spring constant of the air spring can be adjusted to the travelling condition or the like of an automobile from the outside at the same time, a ride comfort and controllability can be properly matched with car type, vehicle speed and the liking of a driver.

On the other hand, even in said suspension, since the spring constant of a rubber bushing interposed between the shock absorber and a car body is fixed and cannot be changed, the provision of a better ride comfort and controllability is limited. This is because the spring characteristics of the whole suspension is determined as the synthetic ones including the damping force of the shock absorber, the spring constant of the air spring and the spring constant of the bushing.

For example, in a cushion assembly disclosed in Japanese Utility Model Public Disclosure (KOKAI) No. 199112/82, cushions having an enclosed space respectively are disposed at both sides of a fixed member to sandwich the same. Both enclosed spaces communicate to each other through an orifice and are filled with fluid. When small vibration is applied, fluid flows through the orifice to produce a damping force. However, when large vibration is applied, the fluid acts like a rigid body so that the damping force is not produced. Even if the spring characteristics of the whole suspension can be improved by incorporating such a cuhsion assembly as a bushing interposed between the shocks absorber and the car body, the spring constant of the bushing cannot be adjusted from the outside to be matched with the shock absorber and the air spring.

An object of the present invention is to provide a suspension for a vehicle in which the spring characteristics of the whole suspension can be adjusted manually or automatically from the outside.

A further object of the present invention is to provide a suspension for a vehicle in which the damping force of a shock absorber, the spring constant of an air spring and the spring constant and damping force of a bushing can be adjusted by a single actuator.

The suspension for a vehicle according to the present invention comprises a shock absorber capable of adjusting a damping force for damping vibration given by a wheel, a bushing interposed between the shock absorber and a car body and capable of adjusting the spring constant and the damping force, an air spring capable of adjusting the spring constant for damping vibration given by said wheel in cooperation with said shock absorber and an actuator for adjusting the damping force of said shock absorber, the spring constant and damping force of the bushing and the spring constant of the air spring.

According to the present invention, the damping force of the shock absorber, the spring constant of the air spring and the spring constant and damping force of the bushing can be adjusted manually or automatically from the outside so that the synthetic spring characteristics of suspension can be optimized to improve a ride comfort and controllability.

Since every suspension can be operated by a single actuator or all suspensions for front, rear, left and right wheels can be operated by a single actuator comprising a tank, air compressor or others, cost of equipment and weight of the actuator can be reduced.

Since the number of actuators is small, operating sounds are reduced and power consumption for operating the actuator is reduced to lessen load of batteries or the like.

The suspension according to the present invention is automatically controlled on the basis of signals from various sensors to control positions of antirolling, antidiving, antisquatting and others so that a better ride comfort and improved controllability can be provided to improve the synthetic performance of a vehicle.

The other objects and features of the present invention will become apparent from the following description of preferred embodiments of the invention with reference to the accompanying drawings.

DESCRIPTION OF THE PREFERRED EMBODIMENTS

Figure 1:
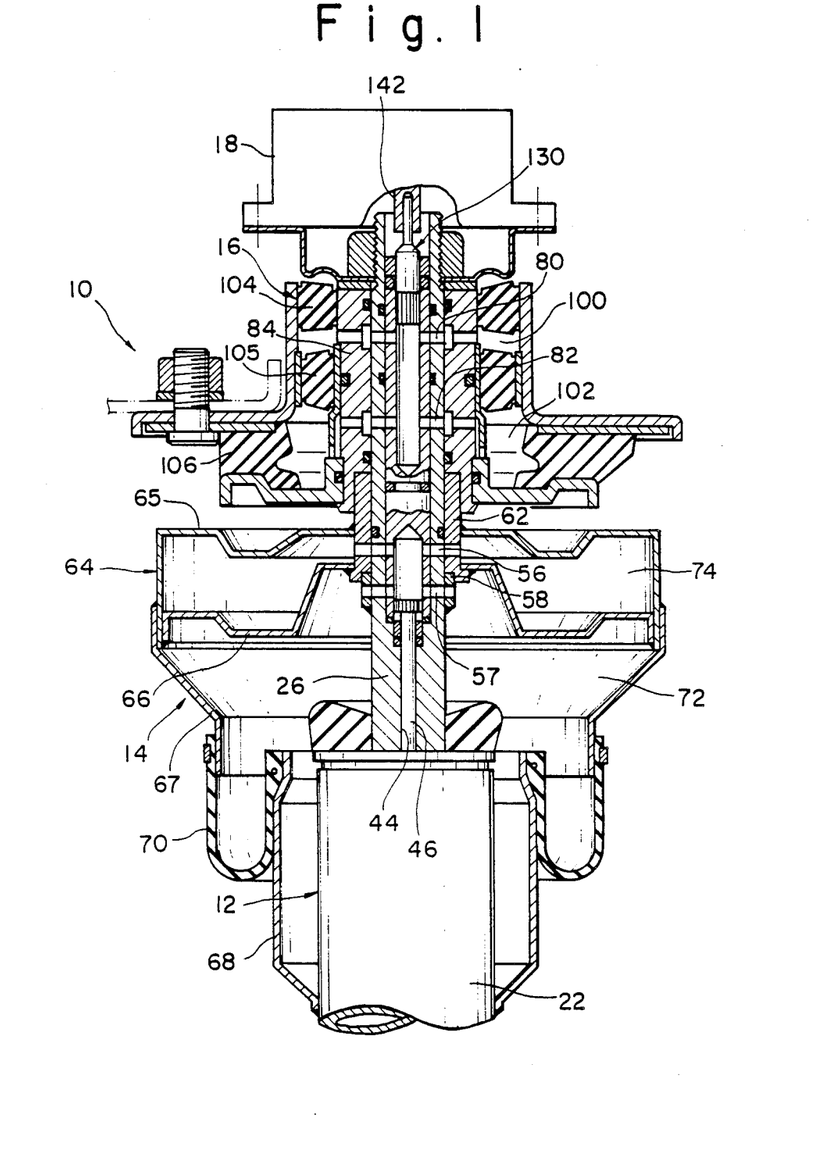
FIG. 1 is a sectional view showing principal parts of a suspension according to the present invention.

As shown in FIG. 1, a suspension 10 for a vehicle comprises a shock absorber 12, an air spring 14, a bushing 16 and an actuator 18.

Figure 2:
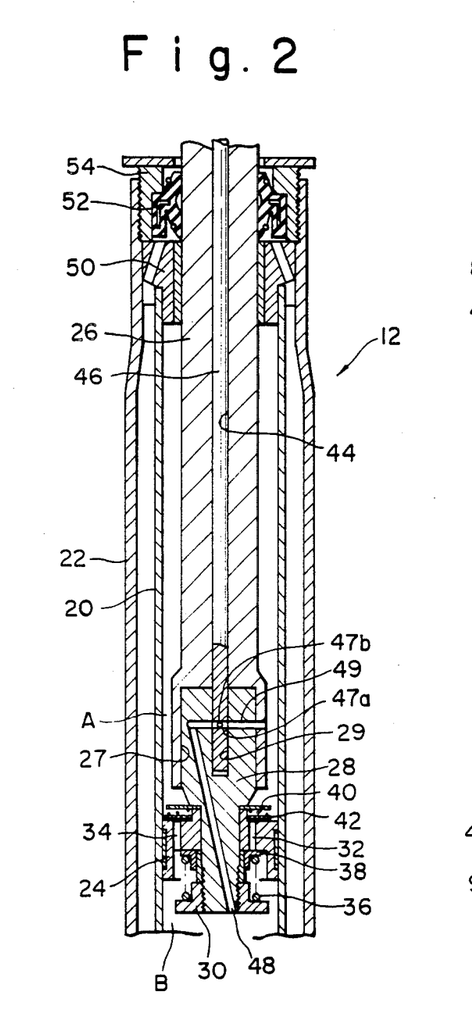
FIG. 2 is a sectional view showing principal parts of a shock absorber.

In an embodiment shown in FIG. 2, the shock absorber 12 is of a so-called twin tube type provided with an inner tube 20 and an outer tube 22 disposed spaced from the inner tube. In addition, a so-called mono tube type consisting of only a single tube may be used for the shock absorber 12.

A piston 24 is slidably disposed inside the inner tube 20 and a piston rod 26 is connected to the piston 24. In the embodiment shown, the piston rod 26 is provided in a low end with a bored hole 27 in which an orifice member 28 is press fitted. The orifice member 28 extends through the piston 24 and a nut 30 is screwed onto the end of the orifice member to couple the piston rod 26 with the piston 24 through the orifice member 28.

The piston 24 has a port 32 through which liquid flows in the extension of the piston rod 26 and a port 34 through which liquid flows in the contraction of the piston rod 26. A valve body 38 biased by a spring 36 is disposed at the lower side of the port 32 and a valve body 42 biased by a spring 40 is disposed at the upper side of the port 34.

The piston rod 26 is provided with a hole 44 extending from an upper end face to a lower end face and a control rod 46 is rotatably disposed in the hole 44. The lower end of the control rod 46 extends into a hole 29 aligned with the hole 44 in the orifice member 28 and is provided in the end with an orifice 47a extending diametrally and an orifice 47b spaced circumferentially 60° from the orifice 47a, extending diametrally and having the bore smaller than that of the orifice 47a. On the other hand, the orifice member 28 is provided with a hole 48 extending from an end face over the piston 24 and a hole 49 extending diametrally from the hole 48. The holes 48 and 49 provide a bypass path for the ports 32,34 in the piston 24.

When the orifice 47a is in the position shown, it is opposed to the hole 49 so that a liquid chamber A at one side of the piston 24 communicates to a liquid chamber B at the other side through a bypass path having the large bore. As a result, liquid in the inner tube 20 can flow through the holes 48,49 and the orifice 47a in addition to the ports 32,34 provided inherently in the piston 24. When the control rod 46 is rotated 60°, the orifice 47b is opposed to the hole 49. Therefore, both liquid chambers A,B communicate to each other through a bypass path having the small bore. When said rod is rotated further 60°, the control rod 46 closes the hole 49 to insulate both liquid chambers A,B from each other. Thus, the damping force of the shock absorber 12 is adjusted.

The piston rod 26 projects to the outside through a rod guide 50, a seal member 52 and a ring nut 54 disposed on upper ends of the inner and outer tubes 20,22 and is connected to the bushing 16 as will be later described. On the other hand, the outer tube 22 is connected to a suspension arm (not shown) well known per se to support a wheel.

Figure 3:
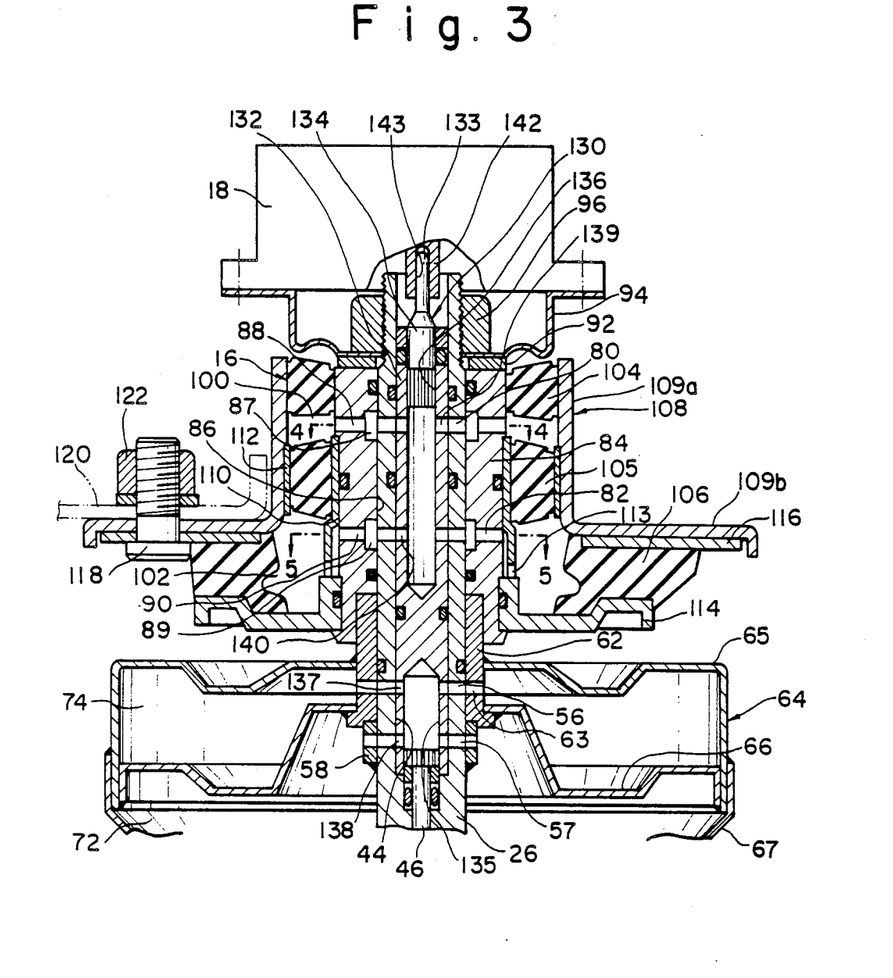
FIG. 3 is a sectional view showing a bushing.

An intermediate portion of the piston rod 26 projecting from the outer tube 22 is provided with two holes 56,57 spaced axially from each other, opened diametrally and communicating to an enlarged portion of the hole 44 extending axially as shown in FIG. 3 in detail. A ring 58 having a hole aligned with the lower hole 57 is welded to the piston rod 26. On the upper side of the ring 58 is disposed a holder 62 having a hole 63 aligned with the upper hole 56 and kept under the air tight condition by an O-ring for sealing.

An inner peripheral edge of a ceiling portion 65 of a housing 64 is welded to a holder 62 above the hole 63. An inner peripheral edge a partition 66 of the housing 64 is welded to the holder 62 below the hole 63 where is the middle between the upper and lower holes 56,57. A tubular portion 67 of the housing 64 is welded to outer peripheral edges of the ceiling portion 65 and the partition 66. As shown in FIG. 1, between the tubular portion 67 of the housing 64 and an air piston 68 welded to the outer tube 22 is stretched a diaphragm 70. As a result, a main air chamber 72 is defined by the housing 64 and the diaphragm 70 and an auxiliary air chamber 74 is defined above the partition 66 of housing 64 so that both air chambers communicate to each other through the holes 44,56,57 in the piston rod 26. Compressed air is enclosed in both air chambers to constitute the air spring 14.

A portion of the piston rod 26 inside the bushing 16 is provided with holes 80,82 spaced axially of the hole 44 from each other and opened diametrally. In the embodiment shown, outside the piston rod 26 is disposed a bushing inner tube 84 formed of high rigidity material like iron. While this is for the convenience of forming the bushing 16 and incorporating it in the piston rod 26, the bushing inner tube 84 may be dispensed with.

Figure 4:
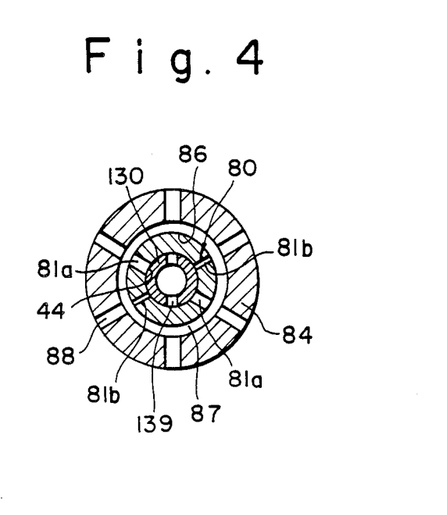
FIG. 4 is a sectional view taken along the line 4—4 in FIG. 3.

In an embodiment shown in FIG. 4, the upper hole 80 consists of a pair of hole portions 81a and a pair of hole portions 81b having the bore smaller than that of the hole portion 81a, both hole portions extending from the hole 44 diametrally toward an outer peripheral surface respectively. In an embodiment shown in FIG. 5, the lower hole 82 consists of a pair of hole portions 83a and a pair of hole portions 83b having the same bore as the hole portion 83a, both hole portions extending diametrally from the hole 44 toward the outer peripheral surface respectively. The upper and lower holes 80,82 are in the same phase relationship as viewed in plan.

The bushing inner tube 84 has a hole 86 through which the piston rod 26 extends, an annular groove 87 provided in a position opposed to the upper hole 80 in the piston rod 26, a plurality of holes 88 (six in FIG. 4) extending from the annular groove diametrally to an outer peripheral surface, annular groove 89 provided in a position opposed to the lower hole 82 in the piston rod 26 and a plurality of holes 90 (six in FIG. 5) extending diametrally from the annular groove 89 to the outer peripheral surface.

The piston rod 26 is inserted into the hole 86 in the bushing inner tube 84. The holder 62 fixed to the piston rod abuts against a shoulder of the hole 86. A washer 92 and a bracket 94 are applied to a portion of the piston rod projecting from the bushing inner tube 84. A nut 96 is screwed onto the piston rod 26. Thus, the piston rod 26 is connected to the bushing inner tube 84. The piston rod 26 and the bushing inner tube 84 are kept air tight by O-rings respectively disposed above the upper annular groove 87 and below the lower annular groove 89.

The bushing 16 has a first fluid chamber 100 communicating to the hole 80 in the piston rod and a second fluid chamber 102 communicating to the hole 82. The bushing 16 is disposed to surround the bushing inner tube 84. In an embodiment shown in FIG. 3, the bushing 16 consists of first, second and third portions 104,105 and 106 annularly formed of rubber, respectively.

The first portion 104 of the bushing is vulcanized and bonded on an inside surface to the end of the bushing inner tube 84 above the hole 88 in the inner tube 84 and on an outside surface to the upper end of a cylindrical portion 109a of a bushing outer tube 108. The second portion 105 of the bushing is vulcanized and bonded on an inside surface to a second bushing inner tube 110 and on an outside surface to a second bushing outer tube 112, respectively. The inner tube 110 is fitted in a position below the hole 88 in the bushing inner tube 84 to which an O-ring is attached. The second portion 105 of the bushing is fixed to the bushing inner tube 84. The second bushing outer tube 112 is fitted in the cylindrical portion 109a of the bushing outer tube 108. As a result, the first fluid chamber 100 is defined between the first portion 104 and the second portion 105 of the bushing.

In the embodiment shown in FIG. 3, the second bushing inner tube 110 extends downward over the hole 90 and abuts against a member 114 on its lower end. The member 114 having an O-ring attached is fitted in the bushing inner tube 84 and fixed by caulking said inner tube 84. A portion of the second bushing inner tube 110 below the portion opposed to the hole 90 has the bore enlarged to form a gap between itself and the bushing inner tube 84. The gap communicates on one hand to the hole 82 in the piston rod through the hole 90 and the annular groove 89 and on the other hand to the second fluid chamber 102 through a plurality of notches 113 provided in the second bushing inner tube 110. The construction of the second bushing inner tube 110 locates conveniently itself.

The third portion 106 of the bushing is vulcanized and bonded on an upper end face to a retainer 116 and on an inner periphery of lower end face to the member 114, respectively. A plurality of serrated bolts 118 (only one is shown in the drawing) are press fitted in the retainer 116, and these bolts 118 extend through a flange 109b of the bushing outer tube 108 and a car body 120. A nut 122 is screwed onto the bolt 118 to fix the third portion 106 of the bushing to the car body 120. As a result, the second fluid chamber 102 is defined between the second portion 105 and the third portion 106 of the bushing.

A valve body 130 consists of first and second valve bodies 132,134. The first valve body 132 has a hole 135 opened from a lower end face axially and a hole 136 opened from an upper end face axially. From the hole 135 are opened holes 137,138 which are axially spaced from each other and extend diametrally toward an outer peripheral surface. The hole 137 can communicate to the hole 56 in the piston rod 26 and the hole 138 to the hole 57 in the piston rod 26. Also, from the hole 136 are opened holes 139,140 which are spaced axially from each other and extend diametrally toward the outer peripheral surface. The hole 139 can communicate to the hole 80 in the piston rod 26 and the hole 140 to the hole 82 in the piston rod 26.

The control rod is serration fitted into the hole 135 in the first valve body 132 to be coupled with the first valve body 132. On the other hand, the second valve body 134 is serration fitted into the hole 136 in the first valve body 132 to be coupled with the first valve body 132. The second valve body 134 is formed on an upper end with a flat portion 133. The valve body 130 having an O-ring attached is disposed rotatably in the hole 44 in the piston rod 26.

Figure 5:
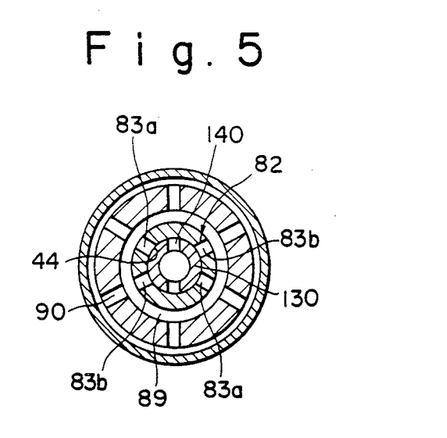
FIG. 5 is a sectional view taken along the line 5—5 in FIG. 3.

When the holes 139,140 in the valve body 130 are in the positions shown in FIGS. 4 and 5, the hole 80 in the piston rod is insulated from the hole 82, the hole 56 from the hole 57 and further the hole 49 in the piston rod inside the shock absorber 12 is insulated.

When the valve body 130 is rotated 60° clockwise, the hole 139 is opposed to a pair of hole portions 81b and the hole 140 to a pair of hole portions 83b so that the first fluid chamber 100 communicates to the second fluid chamber 102 through a path having a small bore. At the same time the orifice 47b having a small bore in the control rod 46 is opposed to the hole 49 in the piston rod 26. Then, the holes 56,57 are preferably formed such that the holes 137,138 in the valve body 130 are respectively opposed to the hole portions having small bores of the holes 56,57 in the piston rod 26, and when the valve body 130 is further rotated 60° clockwise, the holes 137,138 in the valve body 130 are opposed respectively to the hole portions having large bores of the holes 56,57 in the piston rod 26.

When the valve body 130 is furtehr rotated 60° clockwise, the hole 139 is opposed to a pair of hole portions 81a, and the hole 140 to a pair of hole portions 83a, so that the first fluid chamber 100 communicates to the second fluid chamber 102 through the path having the large bore. At this time, since the hole 137 is opposed to the large bore portion of the hole 56 and the hole 138 to the large bore portion of the hole 57, the main air chamber 72 communicates to the auxiliary air chamber 74 through the large bore path, and since the large bore orifice 47a is opposed to the hole 49, the liquid chambers A,B communicate to each other through a large bore path in addition to ports 32,34 inherently provided in the piston 24.

The actuator 18 is coupled with the piston rod 26 through the bracket 94. The actuator 18 consists of a motor or fluid motor and a reduction gear well known per se. The flat portion 133 of the valve body 130 is inserted into a slit 143 provided in an output shaft 142. Therefore, the valve body 130 is rotated by the actuator 18. The actuator 18 is manually or automatically operated on the basis of signals from various sensors.

In the first and second fluid chambers 100,102 is enclosed fluid, i.e., oil or other liquid, air or other gas, or mixture of liquid and gas.

When an automobile travels, the actuator 18 is operated to rotate the valve body 130 by the manual operation of a driver or by the operation of a controller for calculating upon receiving signals of a speed sensor, acceleration sensor rotational angular speed sensor of a steering wheel and other sensors.

When the valve body 130 is in the position shown in FIG. 4, the hole 49 in the piston rod 26, the holes 56,57 and further the holes 80,82 are insulated. As a result, the damping force of the shock absorber 12 is large and the spring constant of the air spring 14 and the spring constant of the bushing 16 are all kept under the hard condition.

When the valve body 13 is rotated 60° clockwise, since the liquid chambers A,B in the shock absorber 12 communicate to each other through the small bore path in addition to the ports inherently provided in the piston 24, the damping force of the shock absorber 12 is of medium value. Also, the main and auxiliary air chambers 72,74 in the air spring 14 communicate to each other through the small bore path so that the medium spring constant is provided. Since the first and second fluid chambers 100,102 of the housing 16 communicate to each other through the small bore path, the spring constant of the bushing 16 is of medium value and the damping force is increased.

When the valve body 130 is further rotated 60° clockwise, the damping force of the shock absorber 12 is reduced, the spring constant of the air spring is softened and the spring constant and damping force of the bushing 16 is reduced.

Figure 6:
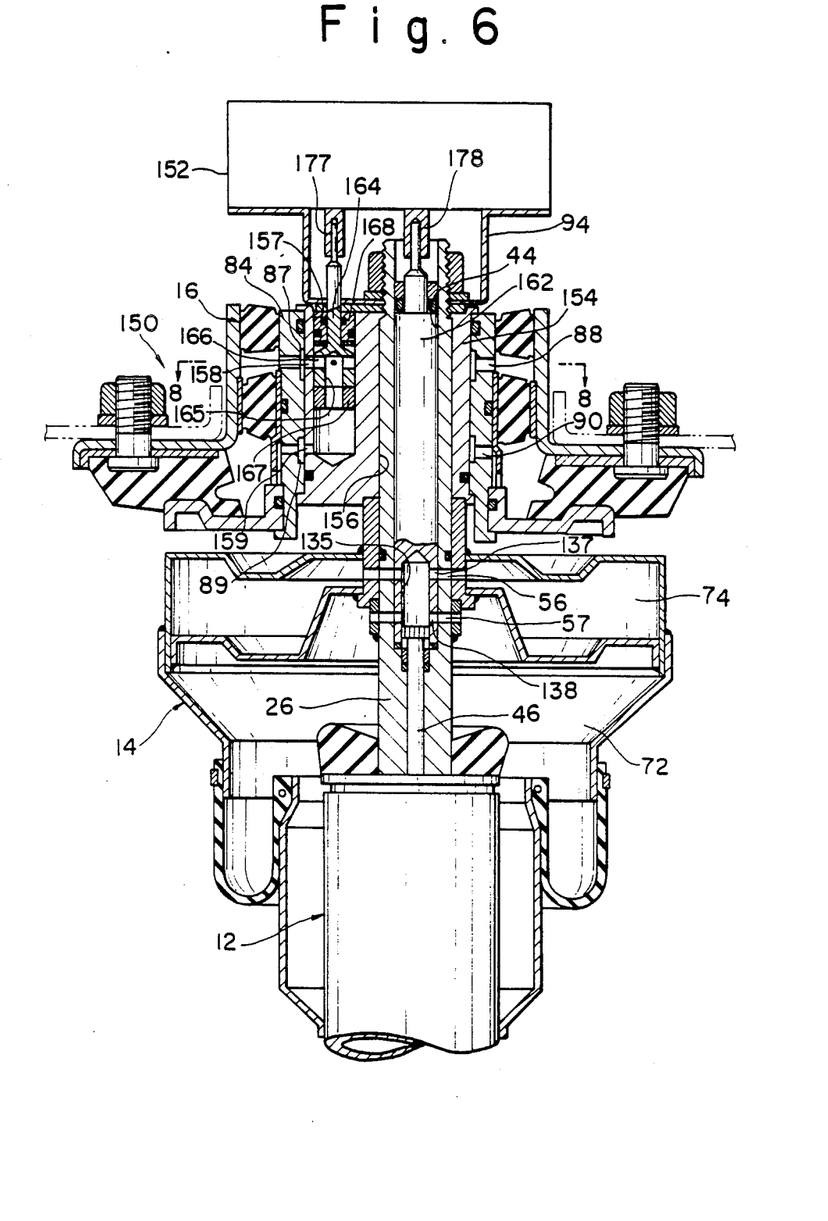
FIG. 6 is a sectional view showing principal parts of a further embodiment of the suspension.

A suspension 150 shown in FIG. 6 is provided with the shock absorber 12, the air spring 14 and the bushing 16 having substantially same construction as said embodiment and further an actuator 152. In the suspension 150, the actuator 152 rotates two valve bodies. In the following description, elements having substantially same construction as said embodiment will be designated by the same symbols as those of said embodiment.

Figure 8:
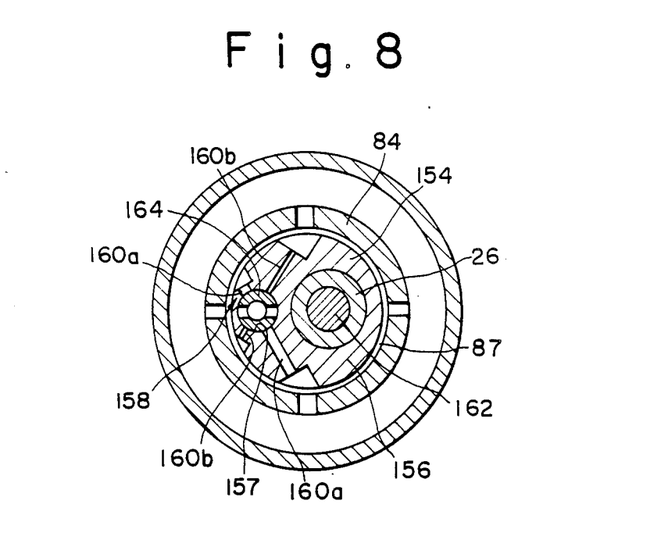
FIG. 8 is a sectional view taken along the line 8—8 in FIG. 6.

A valve base 154 is fitted in the bushing inner tube 84 vulcanized and bonded to the bushing 16 and caulked to fix the valve base 154 to the bushing inner tube 84. The valve base 154 has a hole 156 through which the piston rod 26 extends and a hole 157 extending from an upper end face to the middle in parallel to the hole 156. Holes 158,159 spaced axially from each other are opened to extend from the hole 157 toward an outer peripheral surface. As shown in FIG. 8, the hole 158 consists of a pair of hole portions 160a and a pair of small bore hole portions 160b, the respective hole portions communicating to the annular groove 87 on the bushing inner tube 84. The hole 159 consists of two large bore hole portions, the respective hole portions communicating to the annular groove 89 on the bushing inner tube 84.

A first valve body 162 has the hole 135 bored axially from a lower end and holes 137,138 spaced axially from each other and opened diametrally. The control rod 46 is serration fitted in a lower portion of the hole 138 in the first valve body 162. The first valve body 162 is rotatably disposed in the hole 44 of the piston rod 26 and kept air-tight by an O-ring. The holes 137,138 are opposed respectively to the holes 56,57 in the piston rod 26.

The second valve body 164 has a hole 165 bored axially from a lower end face and a hole 166 opened diametrally and capable of being opposed to the hole 158 in the valve base 154. A cylindrical spacer 167 is press fitted into the hole 157 in the valve base 154 and the second valve body 164 is rotatably disposed on the spacer 167 to be prevented from drop-out by a holder 168 kept air-tight by O-rings.

Figure 7:
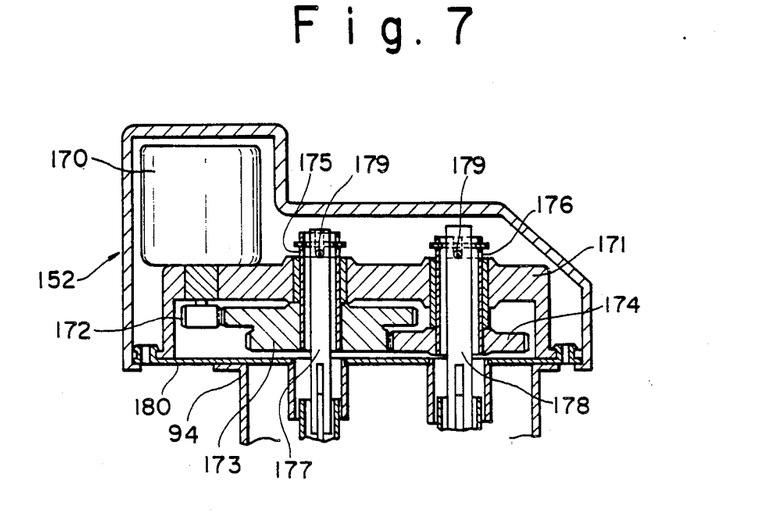
FIG. 7 is a sectional view showing an actuator used for the suspension shown in FIG. 6.

As shown in FIG. 7, the actuator 152 is provided with a motor 170 mounted on a bracket 171. A first gear 172 is fixed to an output shaft of the motor. Second and third gears 173,174 are fixed respectively to tubes 175,176 rotatably supported by the bracket 171. Shafts 177,178 are coupled with one tube 175 and the other tube 176 by a pin 179, respectively. The second gear 173 is a stepped gear meshing on one hand with the first gear 172 and on the other hand with the third gear 174. The bracket 171 is coupled with the bracket 94 through a plate 180. The bracket 94 is fixed to the piston rod 26. The flat portions of the second and first valve bodies 164,162 are inserted into the slits of the shafts 177,178, respectively.

In the embodiment shown in FIGS. 6–8, the rotational angles of the first and second valve bodies 162,164 can be set at will to expand the freedom of design.

Figure 9:
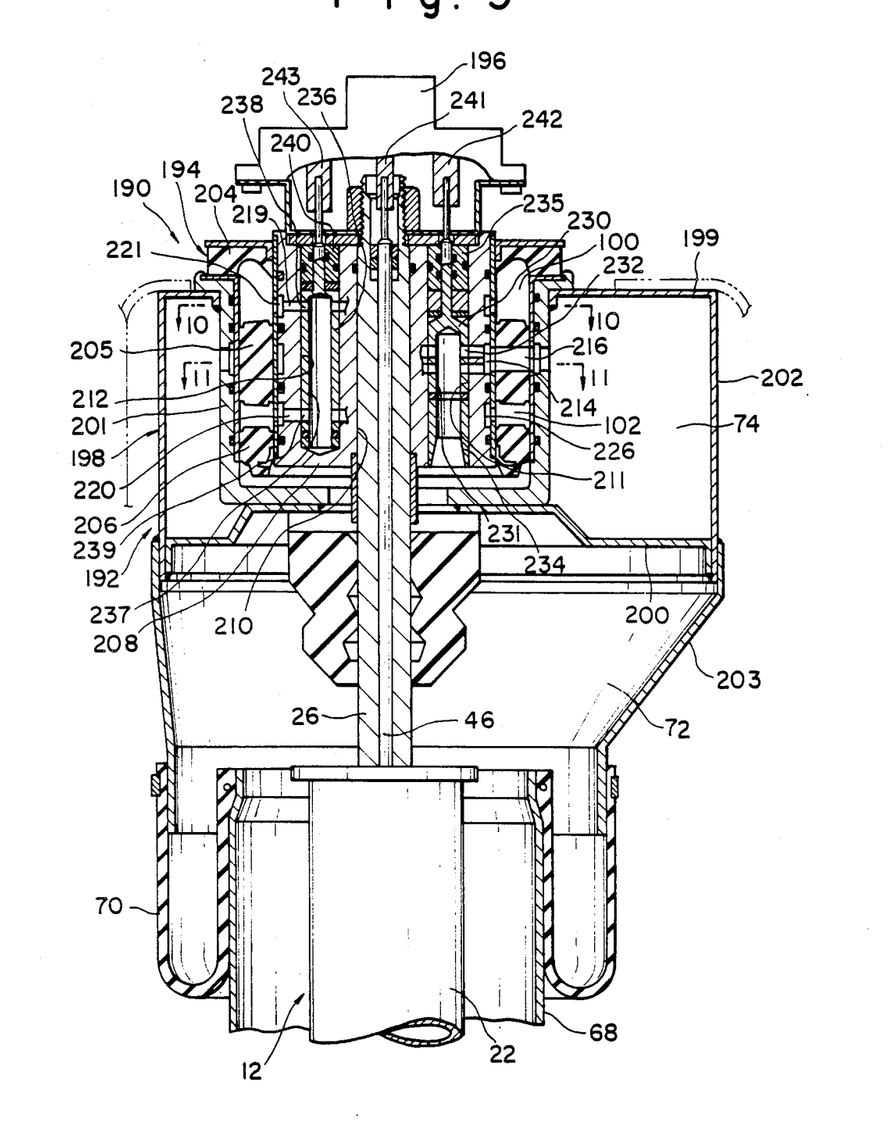
FIG. 9 is a sectional view showing principal parts of a further embodiment of the suspension.

A suspension 190 shown in FIG. 9 is provided with the shock absorber 12 having substantially same construction as said embodiment and further with an air spring 192, a bushing 194 and an actuator 196. In the suspension 190, the actuator 196 rotates three valve bodies.

Inner peripheral edges of a ceiling portion 199 of a housing 198 and a partition 200 are welded to a support member 201, and first and second tubular portions 202,203 of the housing are welded to an outer peripheral edge of the partition 200. Between the second tubular portion 203 of the housing 198 and the air piston 68 fixed to the outer tube 22 of the shock absorber is stretched the diaphragm 70. As a result, the main air chamber 72 is defined by the housing 198 and the diaphragm 70 and the auxiliary air chamber 74 is defined above the partition 200 of the housing 198, both air chambers communicating to each other through holes which will be later described. Both air chambers are filled with compressed air to constitute the air spring 192.

The bushing 194 is provided with the first and second fluid chambers 100,102. In this embodiment, the bushing 194 consists of first, second and third portions 204,205 and 206. The respective portions are formed in the approximately same way as said embodiment and a valve base 208 is press fitted into the bushing 194 under the air-tight condition. Also the bushing 194 is press fitted into the support member 201 under the air-tight condition.

Figure 10:
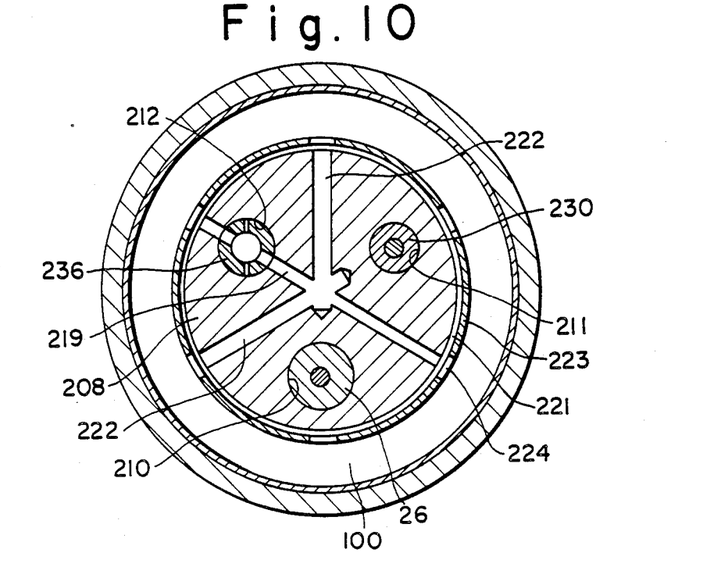
FIG. 10 is a sectional view taken along the line 10—10 in FIG. 9.
Figure 11:
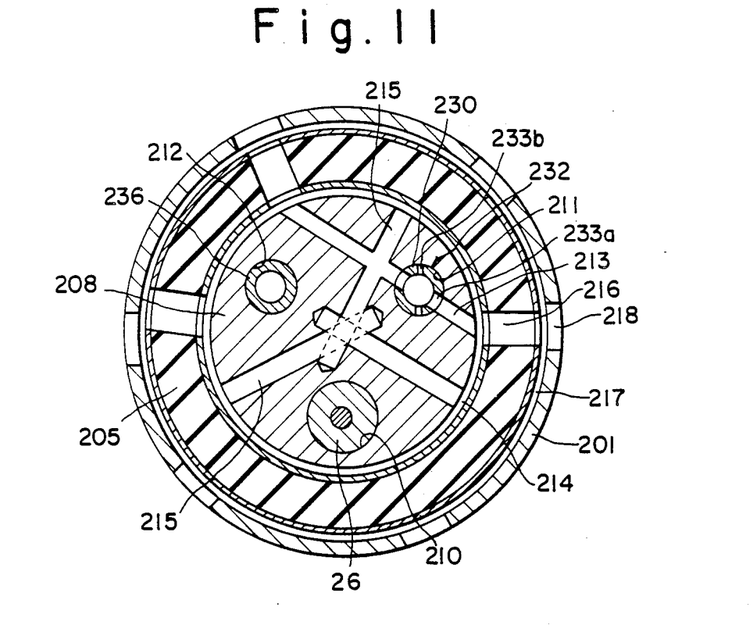
FIG. 11 is a sectional view taken along the line 11—11 in FIG. 9.

As shown in FIGS. 10 and 11, the valve base 208 has a hole 210 through which the piston rod 26 extends, a hole 211 in which the first valve body is disposed and which extends from an upper end to a lower end in parallel to the hole 210 and a hole 212 in which the second valve body is disposed and which extends from an upper end to a middle in parallel to the hole 210 as apexes of an equilateral triangle.

As shown in FIG. 11, the valve base 208 is provided with a hole 213 crossing diametrally the hole 211, extending to an outer peripheral surface and communicating to an annular groove 214. Three holes 215 are provided from the annular groove 214 toward a central portion to disperse air flow. One of the holes 215 crosses the hole 213. The annular groove 214 communicates to the auxiliary air chamber 74 through a plurality of holes 216 (three are shown in the drawing) opened diametrally in the second portion 205 of the bushing, an annular groove 217 on the support member 201 and a plurality of diametral holes 218 (six are shown in the drawing).

Two holes 219,220 are provided which are spaced vertically from each other to diametrally extend from the hole 212 in the valve base 208. As shown in FIG. 10, the hole 219 communicates to an annular groove 221. Two holes 222 are provided to disperse air flow from the annular groove 221 toward the central portion and join the hole 219. The annular groove 221 communicates to the first fluid chamber 100 through a plrualtiy of holes 224 (six are shown in the drawing) provided in a bushing inner tube 223. On the other hand, the hole 220 communicates to an annular groove 226 in the same arrangement as the hole 219, and the annular groove 226 communicates to the second fluid chamber 102.

A first valve body 230 has a hole 231 bored axially from a lower end and a hole 232 opened diametrally. In the embodiment shown in FIG. 11, the hole 232 consists of a pair of hole portions 233a and a pair of small bore hole portions 233b. A cylindrical spacer 234 is press fitted into the hole 211 in the valve base 208 and the first valve body 230 is rotatably disposed on the spacer so that the first valve body 230 is prevented from drop-out by a holder 235 kept air-tight by O-rings. When the hole 232 in the first valve body 230 is opposed to the hole 213 in the valve base 208, the main air chamber 72 communicates to the auxiliary air chamber 74.

A second valve body 236 has a hole 237 bored axially from a lower end and holes 238,239 spaced axially from each other, opened diametrally from the hole 237 and capable of being opposed to the holes 219,220 in the valve base 208. A cylindrical spacer is press fitted into the hole 212 in the valve base 208 and the second valve body 236 is rotatably disposed on the spacer to prevent the second valve body 236 from dropping-out by a holder 240 kept air-tight by an O-ring.

The actuator 196 comprises three gears meshing with a drive gear directly connected to a motor. Shafts 241,242 and 243 are coupled with the respective gears, as shown in FIG. 7. And the control rod 46, the first valve body 230 and the second valve body 236 are inserted into the shaft 241, the shaft 242 and the shaft 243, respectively.

In the embodiment shown in FIG. 9, the rotational angles of three shafts can be set at will.

In said respective embodiments, each valve body is rotated to change the damping force and the spring constant, and a motor can be used for the actuator so that the responsive property can be improved and the rotational range can be controlled in a plurality of steps. On the other hand, the actuator has to be provided in every suspension. Therefore, total four actuators are needed for front, rear, left and right wheels.

Hereinafter will be described a suspension in which the damping force and the spring constant are changed by moving a valve body axially with a single hydraulic source for four wheels.

Figure 12:
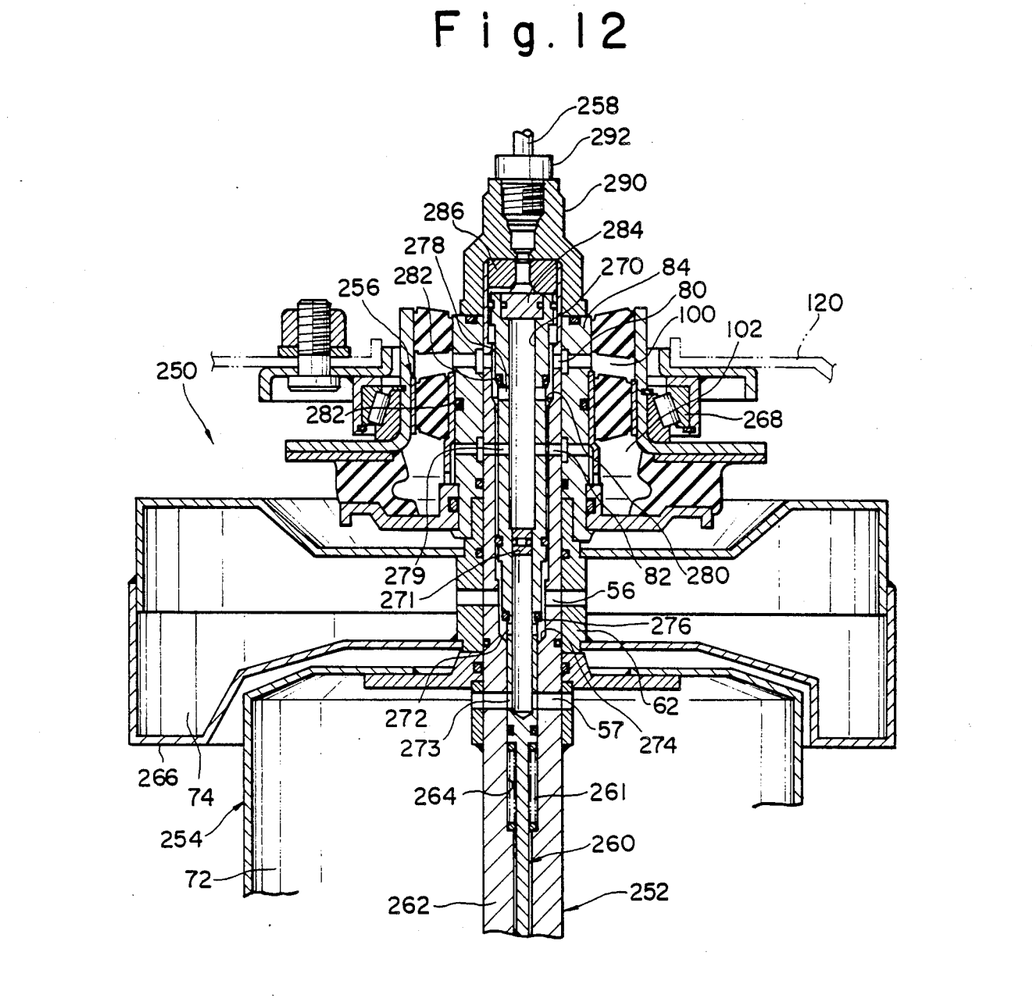
FIG. 12 is a sectional view showing principal parts of a further embodiment of the suspension.

A suspension 250 shown in FIG. 12 is provided with a shock abosorber 252, an air spring 254, a bushing 256 and a hose 258 connected to an actuator (not shown) such as an air tank and an air compressor.

The shock absorber 252 differs from the shock absorber 12 shown in FIG. 2 slightly in the adjusting mechanism of the damping force, since a control rod 260 moves axially instead of rotation. That is, in the shock absorber 252, the control rod 26 is biased upward by a spring 261. The control rod 260 is provided with an orifice which communicates to the hole 49 when the control rod 260 is in an upper position shown in the drawing and insulated from the hole 49 when the control rod 260 moves downward.

While the lateral holes or the like provided in the piston rod 262 of the shock absorber 252 are substantially same as those in the piston rod 26, an axial hole 264 differs slightly from the hole 44. Also as will be later described, the control rod 260 is formed as configuration provided integrally with the valve body 130.

The air spring 254 is provided with the main air chamber 72 and the auxiliary air chamber 74 which is formed by an independent housing 266. The housing 266 is welded to the holder 62.

The bushing 256 differs from the bushing 16 in that it is supported on the car body 120 through a ball and roller bearing 268. That is, since the suspension 250 is used for a wheel which is steered by a steering wheel, the bushing 256 is supported on the car body 120 through the ball and roller bearing.

The control rod 260 has a hole 270 bored axially from an upper end. The hole 270 is divided into two by a plug 271 to which an O-ring is attached. Holes 272,273 spaced axially from each other and extending diametrally are opened from the lower hole portion of the hole 270. When the control rod 260 is biased upward as shown in drawing, the hole 272 is located above a shoulder 274 provided on the hole 264 in the piston rod 262. The shoulder 274 is located in the middle between the holes 56,57 in the piston rod 262. On the other hand, when the control rod 260 is biased upward, the hole 273 is opposed to the hole 57 in the piston rod 262. A seal member 276 capable of closely contacting the shoulder 274 is adhered to a position above the hole 272 in the control rod 260. The seal member 276 has the size sufficient to provide a gap between itself and the hole 264 in the piston rod 262.

From the hole portion in the control rod 260 above the plug 271 are opened holes 278,279 spaced axially from each other and extending diametrally. When the control rod 260 is biased upward as shown in the drawing, the hole 278 is located above a shoulder 280 provided on the hole 264 in the piston rod 262. The shoulder 280 is located in the middle between the holder 80,82 in the piston rod 262. On the other hand, the hole 279 is opposed to the hole 82 in the piston rod 262 when the control rod 260 is biased upward. A seal member 282 capable of closely contacting the shoulder 280 is adhered to a position above the hole 278 in the control rod 260. The seal member 282 has the size sufficient to provide a gap between itself and the hole 264 in the piston rod 262.

A plug 284 to which an O-ring is attached is press fitted into the hole 270 in the piston rod 260, and the control rod 260 is disposed axially movably in the hole 264 in the piston rod 262. A spacer 286 is disposed in the hole 264 in the piston rod 262 and a box nut 290 is screwed onto the piston rod 262. Thus, the piston rod 262 is coupled with the bushing inner tube 84 and the control rod 260 is held in the piston rod 262.

To the box nut 290 is connected the hose 258 by a connector 292. When pressurized fluid, for example compressed air is introduced into the hose 258, the compressed air acts on the plug 284 through a hole of the spacer 286 to depress the control rod 260. As a result, the orifice gets out of the hole 49 so that the hole 49 is closed. At the same time the seal member 276 closely contacts the shoulder 274 so that the main air chamber 72 is insulated from the auxiliary air chamber 74. also, since the seal member 282 closely contacts the shoulder 280, the first fluid chamber 100 is insulated from the second fluid chamber 102.

When a change-over valve (not shown) is changed over to release the compressed air to the atmosphere, the control rod 260 is returned to the position shown in the drawing by the spring 261 to reduce the damping force and the spring constant.

Figure 13:
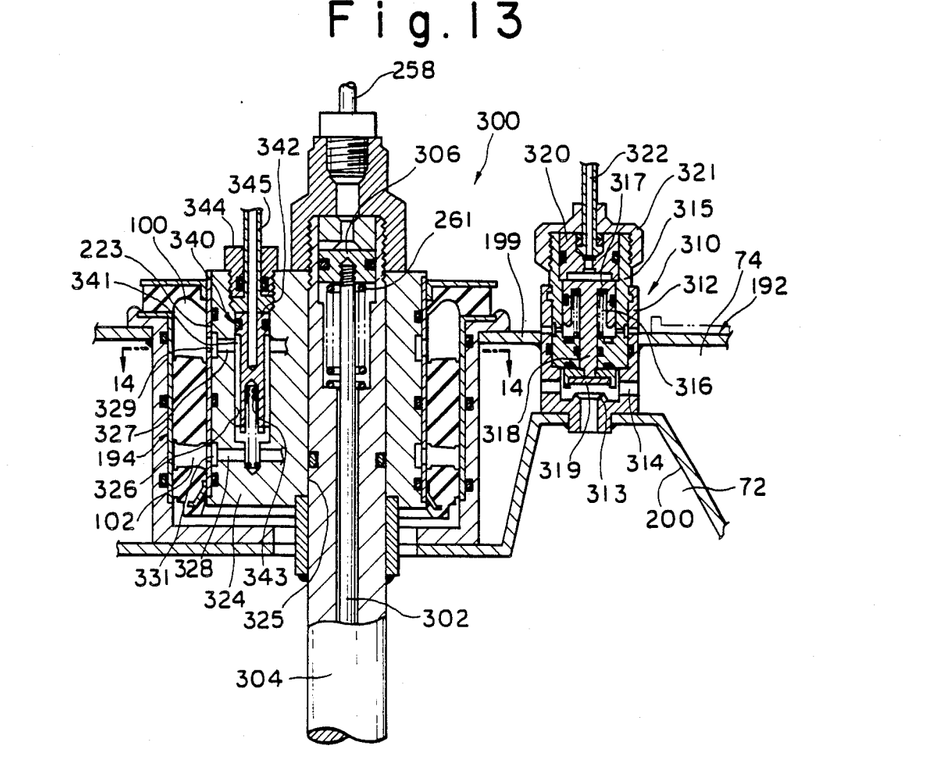
FIG. 13 is a sectional view showing principal parts of a further embodiment of the suspension.

A suspension 300 shown in FIG. 13 has three valve bodies moved axially. The suspension 300 is provided with the air spring 192 and the bushing 194 having substantially same constitution as those shown in FIG. 9, respectively.

In the suspension 300, a control rod 302 of the shock absorber is axially movably disposed in a piston rod 304 to be biased upward by the spring 261. The control rod 302 is serration fitted in a piston 306 which is disposed in the piston rod 304 to be moved by pressurized fluid introduced into the hose 258.

A valve 310 affords and interrupts communication between the main and auxiliary air chambers 72,74 in the air spring 192. The valve 310 has a cylindrical case 312 opening to the main air chamber 72, the case being 312 welded to the ceiling portion 199 and partition 200 of the housing. The case 312 has a valve seat 313 inside itself and a hole 314 extending diametrally in the peripheral wall and opening to the auxiliary air chamber 74.

A cylinder 315 is disposed in the case 312 under the air-tight condition to be fixed to the case 312 by caulking the case 312. In the cylinder 315 is disposed movably a piston 317 biased upward by a spring 316. A stem 318 integral with the piston 317 projects downward through an opening of the cylinder 315. The stem 318 is formed on a lower end with a valve body 319.

In the cylinder 315 is fitted a plug 320 under the air-tight condition and a hose 322 connected to an actuator is connected to the cylinder 315 by a box nut 321. When pressurized fluid is introduced into the hose 322, the valve 319 together with the piston 317 is moved downward to closely contact the valve seat 313 and interrupt communication between the main and auxiliary air chambers 72,74.

Figure 14:
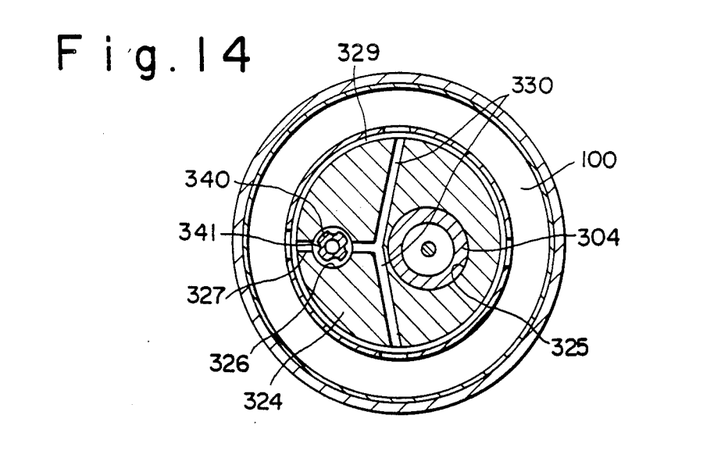
FIG. 14 is a sectional view taken along the line 14—14 in FIG. 13.

A valve base 324 inside the bushing 194 has a hole 325 through which the piston rod 304 extends, a hole 326 which extends from an upper end face to a middle in parallel to the hole 325 and into which the valve body is inserted and holes 327,328 which cross the hole 326 and are spaced axially from each other. As shown in FIG. 14, the hole 327 extends from an outer peripheral surface to a middle and communicates to an annular groove 329 at the outer peripheral surface. On the other hand, two holes 330 extending from the annular groove 329 to a middle are provided to join the hole 327. The annular groove 329 communicates to the first fluid chamber 100 through a hole provided in the bushing inner tube 223. The hole 328 is disposed in the same arrangement as the hole 327 to communicate to the second fluid chamber 102 through an annular groove 331.

A valve body 340 has a plurality of grooves 341 extending axially on an outer peripheral surface for flowing fluid and a head 324 provided on an upper end. The valve body 340 is movably disposed in the hole 326 in the valve base 324 with an O-ring attached to the head 342 and biased upward by a spring 343. A nut 344 is screwed into the hole 326 to connect a hose 345 leading to the actuator. When pressurized fluid is introduced into the hose 345, the valve body 340 is moved downward, and when the head 342 closes the hole 327, the first fluid chamber 100 is insulated from the second fluid chamber 102.

Two valve bodies may be constituted to expand and contract. That is, in the control rod 260 shown in FIG. 12, the control rod omitting a plurality of holes for affording and interrupting communication between the first and second fluid chambers 100,102 may be coupled with the valve base 324 shown in FIG. 13 and the damping force of the shock absorber and the spring constant of the air spring may be adjusted by the control rod 262 and the spring property of the bushing 256 may be adjusted by the valve body 340, respectively.

Since the operations of further embodiments are similar to that of the first embodiment, the description of the operation is omitted.

What is claimed is:

1. A suspension for a vehicle comprising:
   a shock absorber capable of adjusting the damping force for damping vibration given from a wheel;
   a bushing interposed between the shock absorber and a car body and capable of adjusting the spring constant and damping force;
   an air spring capable of adjusting the spring constant for damping the vibration given from said wheel in cooperation with said shock absorber; and
   at least an actuator for adjusting the damping force of said shock absorber, the spring constant and damping force of said bushing and the spring constant of said air spring.

2. A suspension for a vehicle as claimed in claim 1, wherein the damping force of said shock absorber, the spring constant and damping force of the bushing and the spring constant of the air spring can be adjusted in a plurality of steps.

3. A suspension for a vehicle as claimed in claim 2, wherein the damping force of said shock absorber, the spring constant and damping force of the bushing and the spring constant of the air spring can be adjusted in three steps.

4. A suspension for a vehicle as claimed in claim 2, wherein the damping force of said shock absorber, the spring constant and damping force of the bushing and the spring constant of the air spring can be adjusted in two steps.

5. A suspension for a vehicle as claimed in claim 1, wherein the damping force of said shock absorber, the spring constant and damping force of the bushing and the spring constant of the air spring can be adjusted in a plurality of steps by the rotational motion due to said actuator.

6. A suspension for a vehicle as claimed in claim 5, wherein the damping force of said shock absorber is adjusted by a control rod, the spring constant and damping force of said bushing and the spring constant of said air spring can be adjusted by a common valve body and the control rod and the valve body are rotated by one output shaft of a single actuator.

7. A suspension for a vehicle as claimed in claim 5, wherein the damping force of said shock absorber is adjusted by a control rod, the spring constant and damping force of said bushing are adjusted by a valve body, the spring constant of said air spring is adjusted by a different valve body, the control rod and one valve body is rotated by a first output shaft of a single actuator and the other valve body is rotated by a second output shaft of the actuator.

8. A suspension for a vehicle as claimed in claim 5, wherein the damping force of said shock absorber is adjusted by a control rod, the spring constant and damping force of said bushing are adjusted by a valve body, the spring constant of said air spring is adjusted by a different valve body, the control rod is rotated by a first output shaft of a single actuator, one valve body is rotated by a second output shaft of the actuator and the other valve body is rotated by a third output shaft of the actuator.

9. A suspension for a vehicle as claimed in claim 6, 7 or 8, wherein the damping force of said shock absorber, the spring constant and damping force of said bushing and the spring constant of said air spring can be adjusted in three steps.

10. A suspension for a vehicle as claimed in claim 1, wherein the damping force of said shock absorber, the spring constant and damping force of said bushing and the spring constant of said air spring can be adjusted in two steps by the axial motion due to said actuator.

11. A suspension for a vehicle as claimed in claim 10, wherein the damping force of said shock absorber the spring constant and damping force of said bushing and the spring constant of said air spring are adjusted by a common control rod, said control rod being operated by a single fluid supply means connected to said actuator.

12. A suspension for a vehicle as claimed in claim 10, wherein the damping force of said shock absorber is adjusted by a control rod, the spring constant and damping force of said bushing are adjusted by a valve body, the spring constant of said air spring is adjusted by a different valve body, the control rod and one valve body are adjusted by a first fluid supply means connected to said actuator and the other valve body is operated by a second fluid supply means connected to said actuator.

13. A suspension for a vehicle as claimed in claim 10, wherein the damping force of said shock absorber is adjusted by a control rod, the spring constant and damping force of said bushing are adjusted by a valve body, the spring constant of said air spring is adjusted by a different valve body, the control rod is operated by a first fluid supply means connected to said actuator, one valve body is operated by a second fluid supply means connected to said actuator and the other valve body is operated by a third fluid supply means connected to said actuator.

14. A suspension for a vehicle comprising:
- a shock absorber for damping vibration given from a wheel including a cylinder, a piston dividing the inside of the cylinder into two liquid chambers and a piston rod connected to said piston and having a bypass path for affording communication between said two liquid chambers;
- a bushing interposed between said piston rod and a car body and having two fluid chamber spaced from each other axially of the piston rod;
- an air spring having two air chambers for damping the vibration given from said wheel in cooperation with said shock absorber; and
- an actuator for adjusting the damping force of said shock absorber, the spring constant and damping force of said bushing and the spring constant of said air spring by the rotational motion, the damping force of said shock absorber, the spring constant and damping force of said bushing and the spring constant of said air spring being capable of adjustment in three steps, respectively.

15. A suspension for a vehicle comprising:
- a shock absorber for damping vibration given from a wheel including a cylinder, a piston dividing the inside of the cylinder into two liquid chambers and a piston rod connected to said piston and having a bypass path for affording communication between said two liquid chambers;
- a bushing interposed between said piston rod and a car body and having two fluid chambers spaced from each other axially of the piston rod;
- an air spring having two air chambers for damping the vibration given from said wheel in cooperation with said shock absorber; and
- a fluid supply means for adjusting the damping force of said shock absorber, the spring constant and damping force of said bushing and the spring constant of said air spring by the axial motion, the damping force of said shock absorber, the spring constant and damping force of said bushing and the spring constant of said air spring being capable of adjustment in two steps, respectively.

* * * * *